United States Patent
Abecassis

(12) 
(10) Patent No.: US 7,572,853 B2
(45) Date of Patent: Aug. 11, 2009

(54) FLAME RETARDANT NON HALOGENATED SILICONE COMPOSITION FOR HIGH TEMPERATURE AND AUTOMOTIVE AND BUILDING CONSTRUCTION APPLICATIONS

(75) Inventor: David Abecassis, Huntington, NY (US)

(73) Assignee: Glen Burnie Technologies, LLC

( * ) Notice: Subject to any disclaimer, the term of this patent is extended or adjusted under 35 U.S.C. 154(b) by 307 days.

(21) Appl. No.: 11/471,468

(22) Filed: Jun. 20, 2006

(65) Prior Publication Data

US 2006/0287421 A1 Dec. 21, 2006

Related U.S. Application Data

(60) Provisional application No. 60/692,167, filed on Jun. 20, 2005.

(51) Int. Cl.
 C08K 3/22 (2006.01)
 C08K 3/38 (2006.01)
(52) U.S. Cl. .................................... 524/404; 524/433
(58) Field of Classification Search ................. 524/404, 524/433
 See application file for complete search history.

(56) References Cited

U.S. PATENT DOCUMENTS

| 4,052,357 | A | * | 10/1977 | Marinik | 524/493 |
| 5,605,962 | A | * | 2/1997 | Suzuki et al. | 525/70 |
| 2002/0117325 | A1 | * | 8/2002 | Mennone et al. | 174/121 A |

FOREIGN PATENT DOCUMENTS

| WO | WO 0061683 | 10/2000 |
| WO | WO 0168760 | 9/2001 |
| WO | WO 0222729 | 3/2002 |
| WO | WO 03055792 | 7/2003 |
| WO | WO 2006080714 | 8/2006 |

* cited by examiner

*Primary Examiner*—Kriellion A Sanders
(74) *Attorney, Agent, or Firm*—Thomas A. O'Rourke; Bodner & O'Rourke, LLP

(57) ABSTRACT

Blends of a non-halogenated, formaldehyde-cured silicone rubber are described. The blend includes magnesium oxide and zinc borate. The compositions exhibit thermal stability at high temperatures as well as improved chemical resistance.

20 Claims, No Drawings

FLAME RETARDANT NON HALOGENATED SILICONE COMPOSITION FOR HIGH TEMPERATURE AND AUTOMOTIVE AND BUILDING CONSTRUCTION APPLICATIONS

This application claims priority on U.S. Provisional Patent Application Ser. No. 60/692,167 filed Jun. 20, 2005, the disclosures of which are incorporated herein by reference.

FIELD OF THE INVENTION

The present invention is in the field of polymeric elastomer compositions that are silicone based and which are able to perform over a broad temperature range and show superior chemical resistance as well as resistance to thermal degradation at high temperatures. These compositions have applicability in a wide variety of industries including but not limited to automotive and construction applications.

BACKGROUND OF THE INVENTION

The term elastomer typically refers to ductile tough polymers that frequently have high elasticity. Most elastomers were developed as a cost competitive substitute for vulcanized natural rubber or were formulated to meet a specific property requirement found lacking in natural rubber.

Silicone and organic rubbers are both excellent examples of elastomers. Organic rubbers are long-chain molecules based on a polymer chain of carbon atoms. Silicone polymers are based on a polymer of silicon atoms. Both organic and silicone elastomers often have complex side-chain substitutions to enhance specific properties, but it is the elastomer's polymeric backbone that dominates in performance. Silicone has quartz as a precursor material and organic rubber has petroleum. Silicone elastomers exhibit the widest operating temperature range of any elastomer. Silicones will easily retain their elastomeric properties from −120° F. to +450° F. Organics, on the other hand, have an blastomeric operating temperature range from about −30° F. to +300° F.

The nature of the silicone backbone results generally in superior temperature resistance at all ranges compared to organic elastomers. Silicone based elastomers include rubber and fluorosilicone rubbers. The term silicone rubber can include but is not limited to a variety of materials including room temperature vulcanization (RTV) silicone rubbers, high temperature vulcanization (HTV) silicone rubbers, and low temperature vulcanization (LTV) silicone rubbers. These rubbers are known and are readily available commercially such as SILASTIC®735 black RTV and SILASTIC®732 RTV, both available from Dow Corning, and 106 RTV Silicone Rubber and 90 RTV Silicone Rubber, both available from General Electric. Other suitable silicone materials include the silanes, siloxanes, such as fluorosilicones, dimethylsilicones, liquid silicone rubbers, such as vinyl crosslinked heat curable rubbers or silanol room temperature crosslinked materials, and the like. Other silicone rubbers can include polydimethylsiloxanes and copolymers of ethylene and vinyl dimethylsiloxanes, organic polysiloxane compositions in which the organic polysiloxane is linear or branched, and optionally may contain, in addition to the hydrocarbon groups, certain reactive groups such as for example, hydroxil, hydrolyzable groups, alkenyl groups such as vinyl, hydrogen, fluor, and phenyl. Fluorosilicone rubbers typically include polymethyltrifluoroproplysiloxanes, such as SYLON Fluorosilicone FX11293 and FX11299 sold by 3M.

Although silicone elastomers have better thermal properties than organic elastomers, 450° F. is not very high. As a result, there are applications where silicone elastomers can not be used successfully. Thus, there is a need for silicone elastomer compositions that retain their properties at higher temperatures without thermal degradation. There is also a need for silicone elastomer blends that exhibit superior chemical resistance.

SUMMARY OF THE INVENTION

The present invention is directed primarily to non-halogenated silicone polymers. The preferred silicone is a formaldehyde cured, non-halogenated silicone. The silicon compound can include but is not limited to any one or more silicone elastomers including room temperature vulcanization (RTV) silicone rubbers, high temperature vulcanization (HTV) silicone rubbers, and low temperature vulcanization (LTV) silicone rubbers. These rubbers are known and are readily available commercially such as SILASTIC®735 black RTV and SILASTIC®732 RTV, both available from Dow Corning, and 106 RTV Silicone Rubber and 90 RTV Silicone Rubber, both available from General Electric. Other suitable silicone materials include the silanes, siloxanes, dimethylsilicones, liquid silicone rubbers, such as vinyl crosslinked heat curable rubbers or silanol room temperature crosslinked materials, and the like. Other silicone rubbers can include polydimethylsiloxanes and copolymers of ethylene and vinyl dimethylsiloxanes, organic polysiloxane compositions in which the organic polysiloxane is linear or branched, and optionally may contain, in addition to the hydrocarbon groups, certain reactive groups such as for example, hydroxil, hydrolyzable groups, alkenyl groups such as vinyl, hydrogen, and phenyl. The silicon composition includes about 10 to 15% by weight zinc borate, about 2 to 10% by weight magnesium oxide. In a preferred embodiment, the composition can include in addition, about 2 to 15% magnesium hydroxide as a synergist i.e. a material that enhances the flame retardant capabilities of the blend.

The composition of the present invention has superior high temperature resistance and flame retardant properties. The compositions of the present invention do not char or deteriorate even at temperatures as high as 700 to 800° F. and higher which is considerably higher than conventional silicone rubbers. In addition, the compositions of the present invention have superior chemical resistance and the ability to perform well over sharp temperature gradients. The composition does not interfere with the aldehyde curing mechanism and is also adjusted for burn time and smoke extinction in function of the tests which vary from FAR aerospace norms through UL-94 V0-5V, depending upon the industry specification.

DETAILED DESCRIPTION OF THE INVENTION

The compositions of the present invention are blends of silicone elastomers, preferably non-halogenated silicone elastomers. The blends include zinc borate. In a preferred embodiment, zinc borate is present in a range of about 10 to about 15% by weight. In a more preferred embodiment, zinc borate is present in a range of about 11% to about 14% by weight. The composition also includes magnesium oxide. In a preferred embodiment, magnesium oxide is present in a rage of about 2% to about 15% by weight. In a more preferred embodiment, the magnesium can be present in a range of about 4 to about 12% by weight. In a most preferred range, the magnesium oxide can be present in a range of about 6 to about 10% by weight. The balance would be the silicone elastomer, other conventional plasticizers and additives could also be included.

If additional flame retardant properties are desired, the composition may also include about 2 to about 15% magnesium hydroxide. In a more preferred embodiment, the composition may include about 4 to about 1.2% magnesium hydroxide. In a most preferred embodiment, the composition may include about 6 to about 10% by weight magnesium hydroxide. The silicon compound can include but is not limited to any one or more silicone elastomers including room temperature vulcanization (RTV) silicone rubbers, high temperature vulcanization (HTV) silicone rubbers, and low temperature vulcanization (LTV) silicone rubbers. These rubbers are known and are readily available commercially such as SILASTIC®735 black RTV and SILASTIC®732 RTV, both available from Dow Corning, and 106 RTV Silicone Rubber and 90 RTV Silicone Rubber, both available from General Electric. Other suitable silicone materials include the silanes, siloxanes, dimethylsilicones, liquid silicone rubbers, such as vinyl crosslinked heat curable rubbers or silanol room temperature crosslinked materials, and the like. Other silicone rubbers can include polydimethylsiloxanes and copolymers of ethylene and vinyl dimethylsiloxanes, organic polysiloxane compositions in which the organic polysiloxane is linear or branched, and optionally may contain, in addition to the hydrocarbon groups, certain reactive groups such as for example, hydroxil, hydrolyzable groups, alkenyl groups such as vinyl, hydrogen, and phenyl. The compositions of the present invention may be made in any suitable manner. Typically, the zinc borate and the magnesium oxide are added to the silicone elastomer. If magnesium hydroxide is to be included, the magnesium hydroxide can either be added separately or with either the zinc borate or magnesium oxide. The compositions of the present invention have applicability in the fields of automotive applications and building construction products where thermal stability is desired.

I claim:

1. A thermally stable polymeric blend comprising about 10 to about 15% by weight zinc borate and about 2 to about 10% by weight magnesium oxide and the balance of the composition being a non-halogenated formaldehyde-cured silicone rubber.

2. The composition according to claim 1 further comprising about 2 to about 15% by weight of a synergist.

3. The composition according to claim 2 wherein said synergist is magnesium hydroxide.

4. The composition according to claim 1 wherein said magnesium oxide is present in an amount of about 4 to about 8 weight percent.

5. The composition according to claim 4 wherein said magnesium oxide is present in an amount of about 5 to about 7 weight percent.

6. The composition according to claim 1 wherein said zinc borate is present in an amount of about 11 to about 14 weight percent.

7. A method of forming a thermally stable composition comprising blending about 10 to about 15% by weight zinc borate and about 2 to about 10% by weight agnesium oxide and the balance of the composition being a non-halogenated, formaldehyde-cured silicone rubber.

8. The method according to claim 7 further comprising blending said compositions with about 2 to about 15% by weight of a synergist.

9. The method according to claim 8 wherein said synergist is magnesium hydroxide.

10. The method according to claim 7 wherein said magnesium oxide is present in an amount of about 4 to about 8 weight percent.

11. The method according to claim 7 wherein said magnesium oxide is present in an amount of about 5 to about 7 weight percent.

12. The method according to claim 7 wherein said zinc borate is present in an amount of about 11 to about 14 percent by weight.

13. A polymeric blend comprising a silicone rubber, zinc borate and magnesium oxide and wherein said silicone rubber is a formaldehyde-cured silicone rubber.

14. The polymeric blend according to claim 13 where said silicone rubber is non-halogenated.

15. A polymeric blend comprising about 10 to about 15% by weight zinc borate, about 2 to about 10% by weight magnesium oxide and the balance of the composition being a non-halogenated formaldehyde-cured silicone rubber, said blend being thermally stable to at least about 700 degree. F.

16. The composition according to claim 13 further comprising about 2 to about 15% by weight of a synergist.

17. The composition according to claim 13 wherein said synergist is magnesium hydroxide.

18. The composition according to claim 13 wherein said magnesium oxide is present in an amount of about 4 to about 8 weight percent.

19. The composition according to claim 15 wherein said magnesium oxide is present in an amount of about 5 to about 7 weight percent.

20. The composition according to claim 13 wherein said zinc borate is present in an amount of about 11 to about 14 weight percent.

* * * * *